United States Patent Office

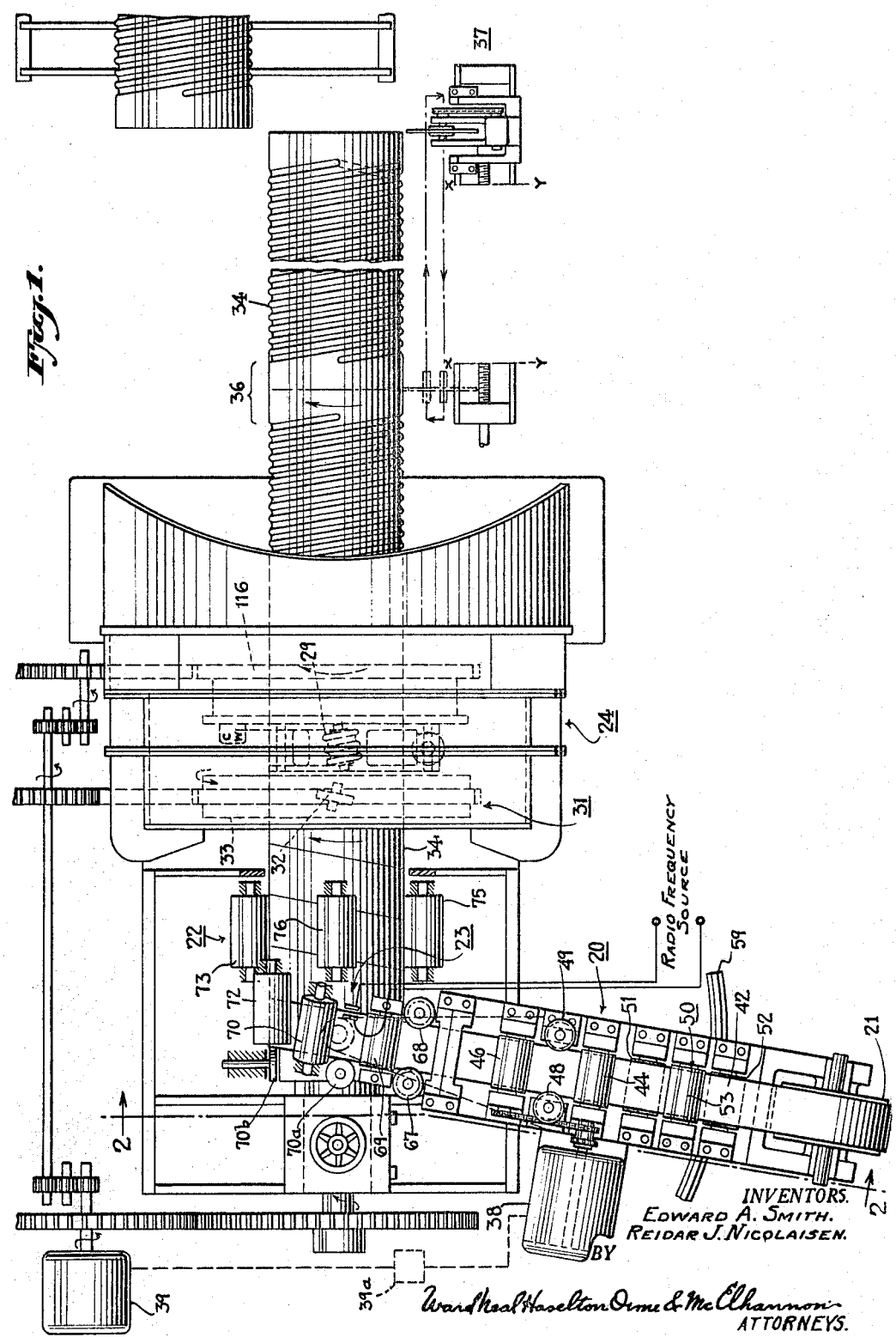

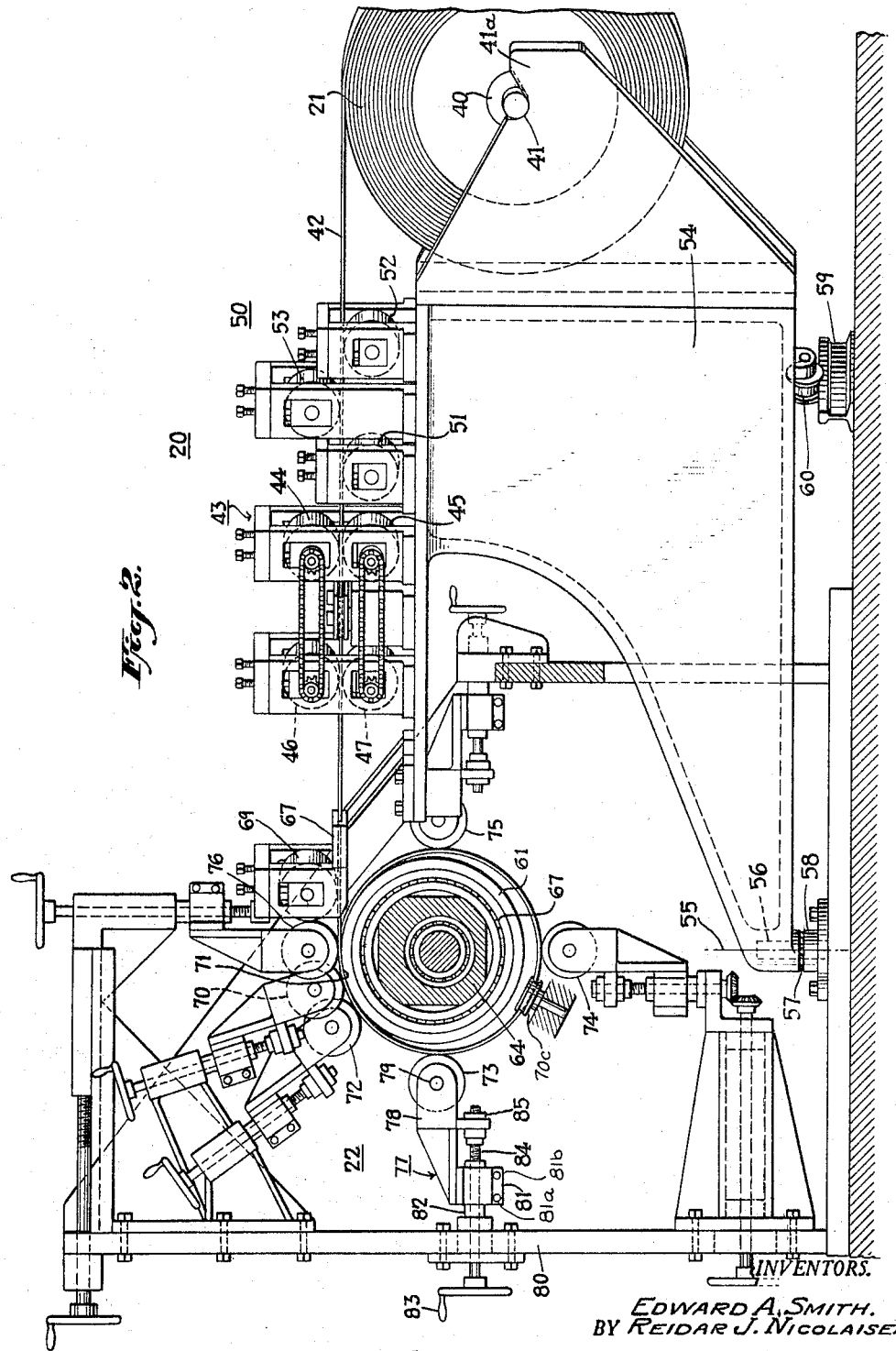

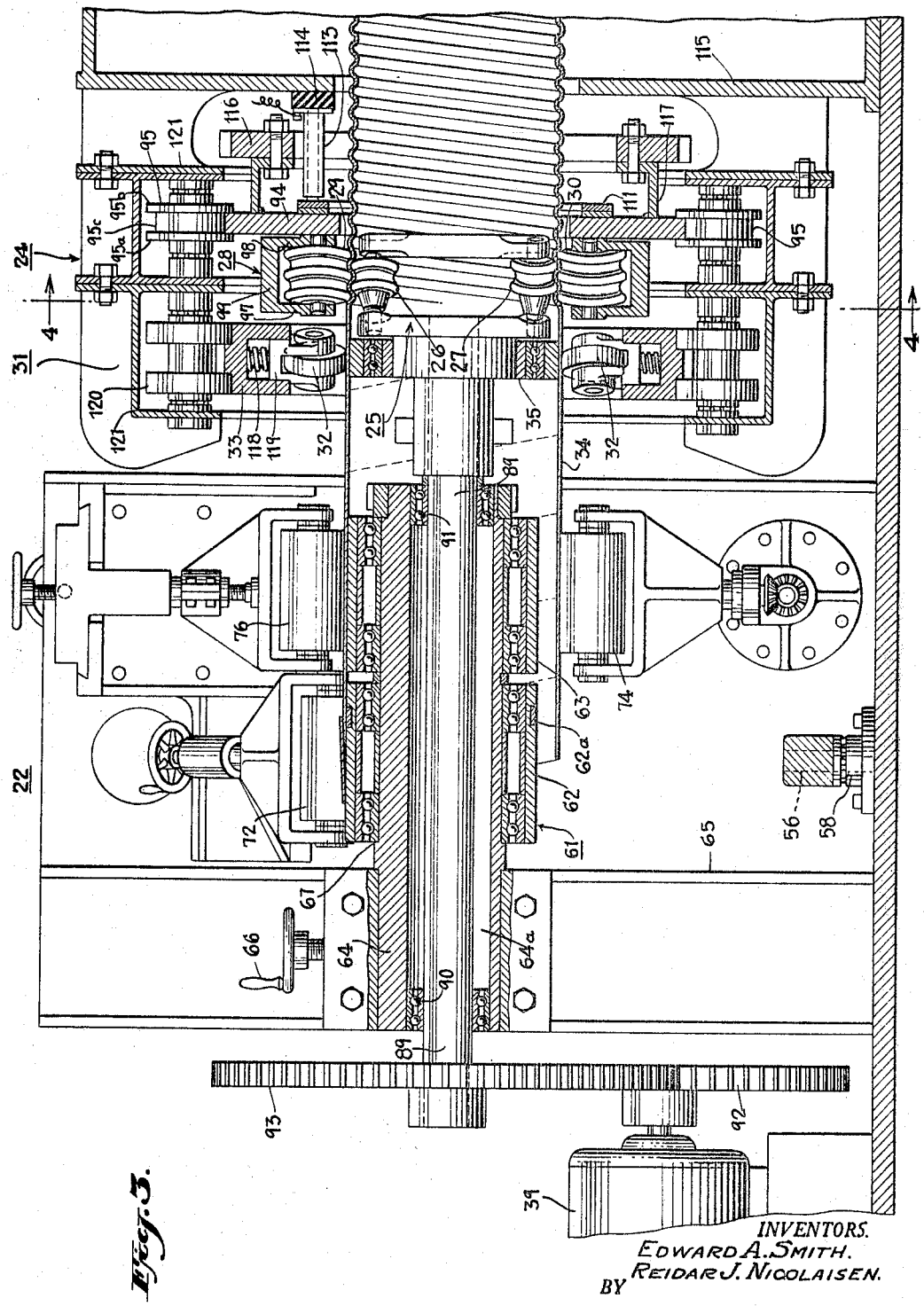

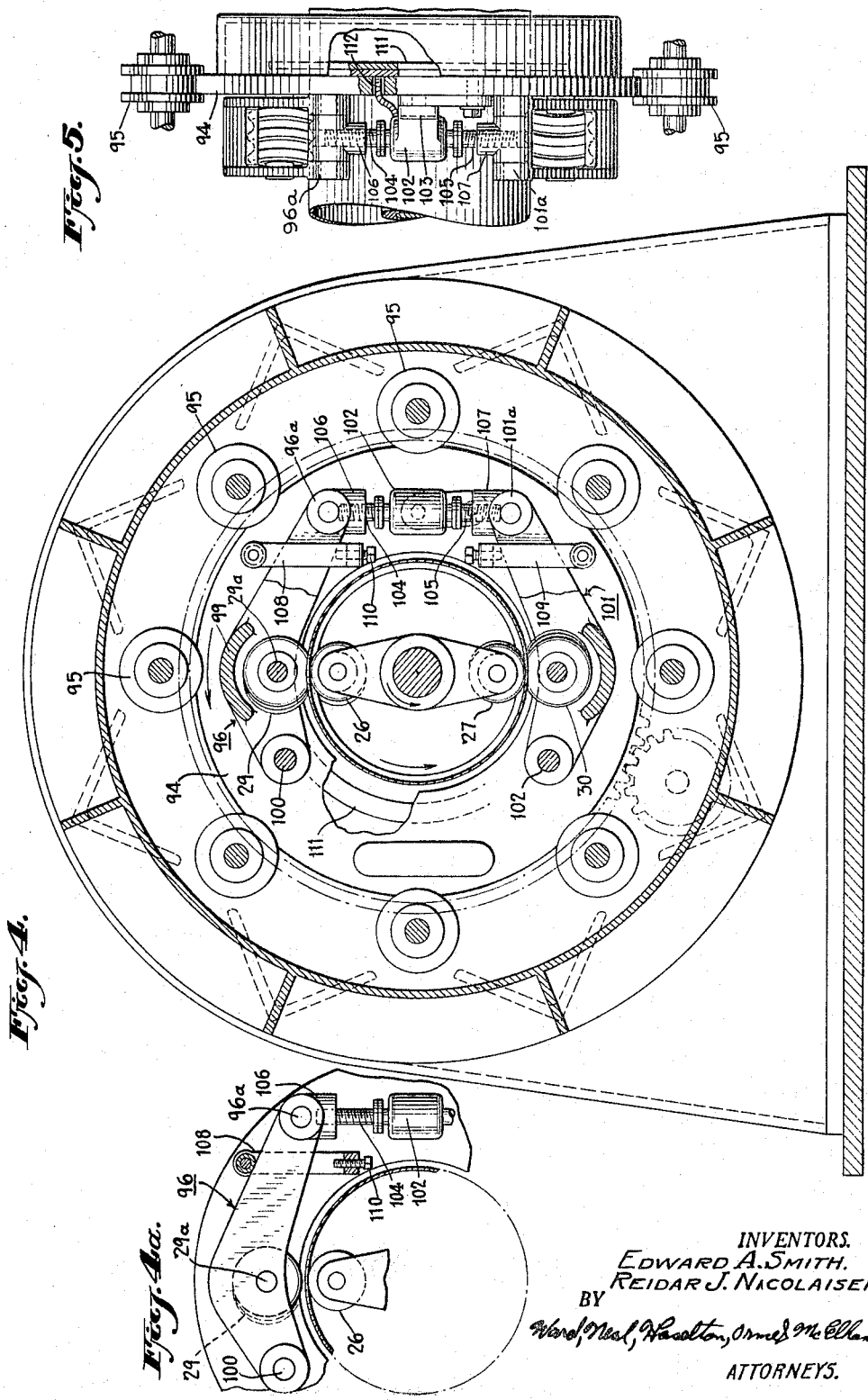

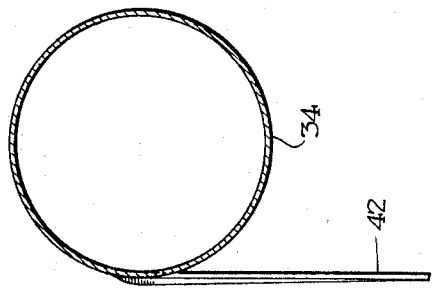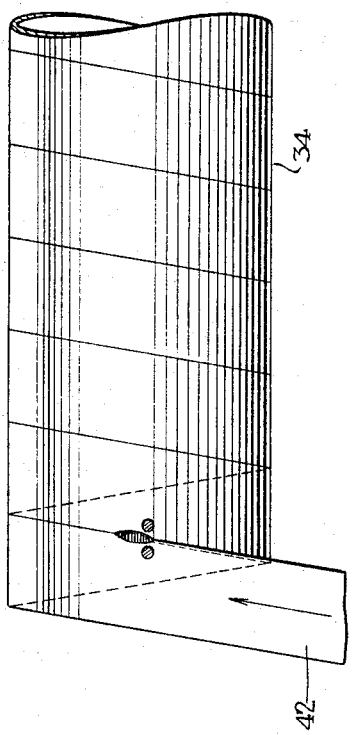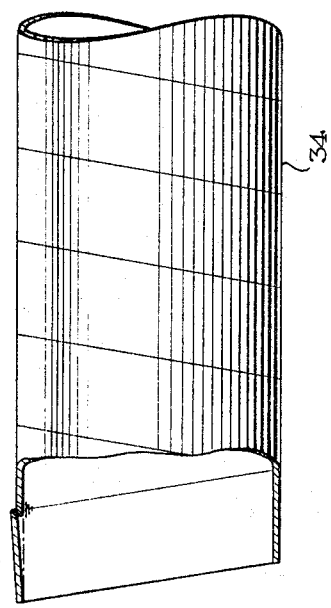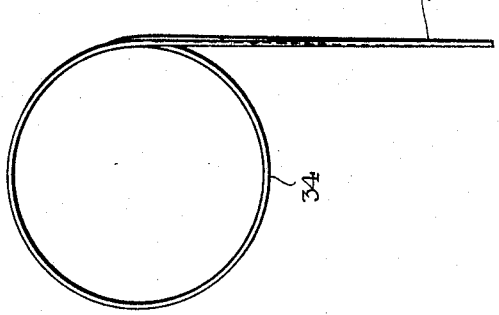

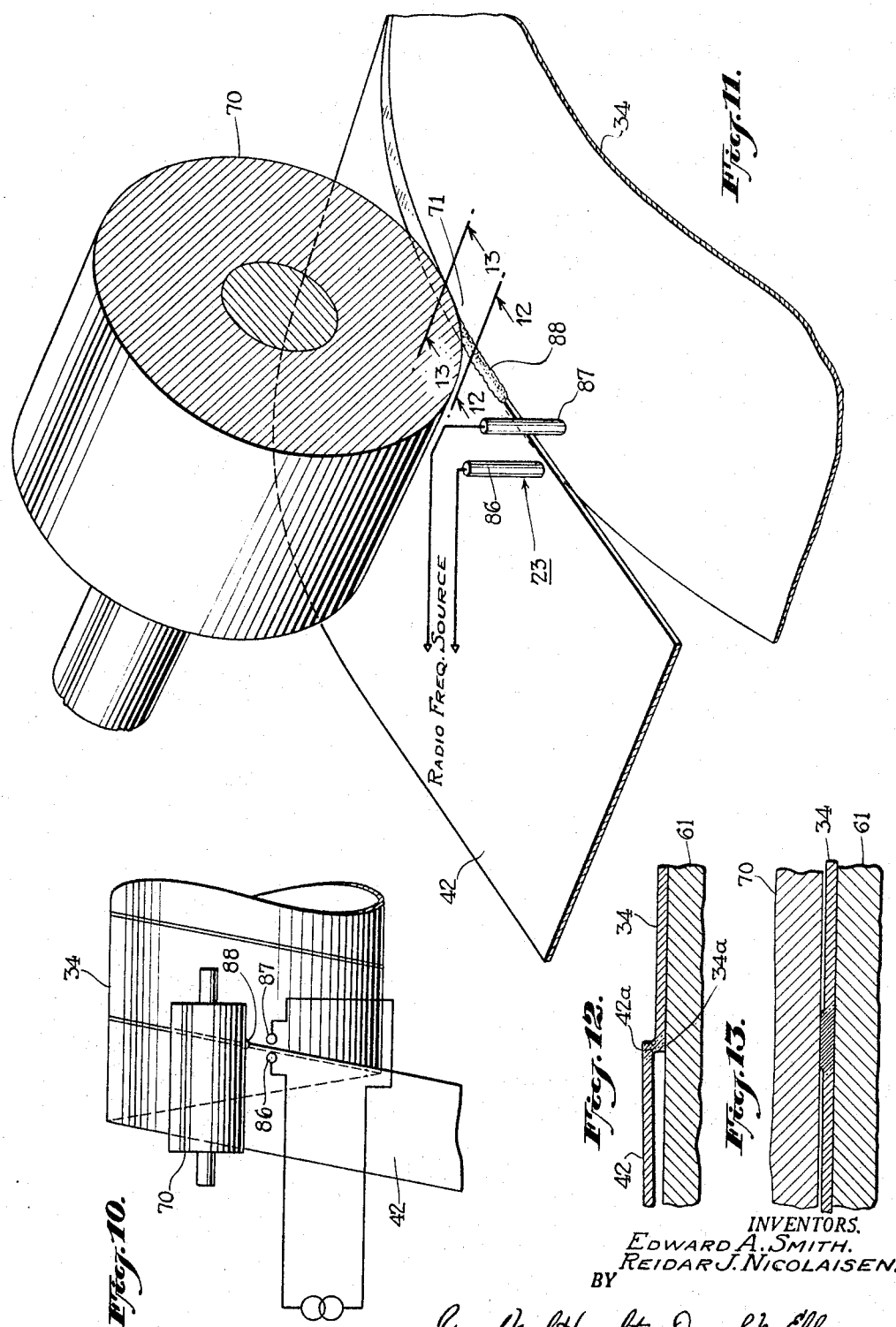

3,269,005
Patented August 30, 1966

3,269,005
METHOD AND APPARATUS FOR FORMING CORRUGATED TUBING
Edward A. Smith, Chatham, N.J., and Reidar J. Nicolaisen, New York, N.Y., assignors to Raymond International Inc., a corporation of New Jersey
Filed Aug. 24, 1955, Ser. No. 530,366
3 Claims. (Cl. 29—477.3)

This invention relates to the manufacture of corrugated tubing, and more particularly to a method and apparatus for continuously winding a strip of sheet material helically into a tube, while welding the adjacent edges of the strip to form a helical weld seam, and simultaneously corrugating the tube so formed.

As is well known in the art, one of the principal objects in corrugating such a tube is to achieve substantial hoop strength of the tube and also to increase the strength and rigidity thereof by cold working of the metal used in forming same.

One of the objects of the present invention is to provide a novel method and apparatus for quickly and inexpensively forming corrugated welded tubing.

A further object is to produce corrugated welded tubing of a type suitable for use in the making of shells for piling which tubing can be produced at a substantially lower cost and at a substantially greater production rate than heretofore attained.

A further object is to provide a novel method and apparatus which is capable of producing corrugated tubing, the lead of the corrugations of which can be selected without reference to the lead of the helix comprising the strip which is wound into the tube.

A further object is to provide a novel apparatus for forming continuously a strip of material into a helically wound tube and for corrugating same, which apparatus is easily adapted for acting upon strip sheet material of varying thickness by relatively simple adjustments thereto.

Apparatus of this general type heretofore suggested for the forming of large-sized corrugated welded tubing, as employed in the forming of piles or underpinning of buildings, has been subject to the substantial disadvantage of being relatively slow in operation and of forming a product which is of substantial expense largely due to such slowness. Furthermore, apparatus of such general type heretofore suggested has not been capable of continuously producing at any substantial speed a corrugated tube wherein the lead of the corrugations is not determined by the lead of the helically wound strip material which is wound helicially into the tube.

According to the present invention, novel method and apparatus for producing corrugated welded tubing are provided which will eliminate the above-noted difficulties or reduce same to insignificance.

The invention in one aspect thereof comprises the novel method for forming corrugated tubing about a selected axis including the steps of feeding strip material longitudinally thereof in a direction initially across such axis and winding same thereabout to form a cylindrical tube while welding at a welding zone the leading edge of a portion of such strip to an adjacent trailing edge of the next turn of strip so wound into the tube and simultaneously applying corrugating pressures to the welded tube at a fixed corrugating zone, such pressures being applied in rotative movement about the axis of the tube.

In another aspect thereof, the present invention is constituted by a novel apparatus including means for winding a strip of sheet material into a helix thereby forming same into tubular shape, means for continuously welding together the adjacent edges of such wound strip, thus permanently forming the tube, and means for corrugating same which acts simultaneously with the formation of the tube, the diameter, of the tube being, for example, of substantial size suitable for use in the making of piles for the underpinning of buildings. The novel apparatus includes in combination a tube former which includes a plurality of guide elements such as rolls or balls, which are spaced around a selected longitudinal axis, and adapted for receiving the aforementioned strip of sheet material which is forcefully directed thereto. The guide elements urge the strip to move in a helical path thereby to assume a tubular shape with the edges of the oncoming strip adjacent to one another, and, if desired, overlapping one another. In one form, the slightly overlapping edges may be subjected continuously to welding means, such as a mash welding device, thereby permanently to form the tube. Such guide elements may have the axes of rotation thereof extending in the same direction with and parallel to the longitudinal axis of the tube formed thereby, and certain of such guide elements may be canted or slightly askew with respect to the direction of such longitudinal axis whereby such axes are substantially perpendicular to the direction of the feed of the oncoming strip. Furthermore, certain of the other guide elements, usually rolls, may have their axes of rotation extending substantially radially with respect to the axis of the tube thereby to engage the rear edge of the strip of sheet material as it is formed into a tube and to aid in urging same into the tube-forming device. Suitable welding means are employed, comprising an element of the tube-forming machine, and which are positioned for continuously welding the leading edge of the oncoming strip to the trailing edge of the tube formed by such helical winding. The guide means for aiding in guiding the oncoming strip into a tube also may include an inner guide element, such as a roll, which extends in the direction of the longitudinal axis of the tube, but which, if desired, may be somewhat smaller in outer diameter than the inner diameter of the tube, the tube formed by the helically wound strip resting upon the upper surfaces of such inner guide element and being guided thereabout by the plurality of guide elements disposed outwardly of the tube. A corrugating head simultaneously acts upon the formed and welded tube, such corrugating head including at least two sub-heads, one of which is disposed within the tube and the other outside of the tube. Such subheads are rotatable about the axis of the tube and thus are rotatable coaxially with respect to one another. Upon each sub-head there are mounted corrugating roll means, the corrugating roll means of both of the sub-heads coacting with one another to produce the corrugations in the tube. The corrugating roll means upon the sub-heads thus are mounted for both rotational movement about their respective axes and planetary movement about the axis of the tube. Suitable means are provided for rotating the sub-heads of the corrugating head together at a common angular speed. The corrugating roll means of the two sub-heads, illustratively, may be slightly canted or angularly offset with respect to the direction of the longitudinal axis of the corrugated tube. That is, the axes of rotation of the corrugating roll means may not necessarily extend in a direction parallel to the axis of the tube but rather may be slightly angularly offset with respect thereto by an amount which is, of course, a function of the lead or pitch of the desired corrugations. Such axes of rotation of the corrugating rolls upon the sub-heads can be angularly offset in such a manner that the corrugations can be formed either passing across the helical welding seam of the tube or otherwise. That is, such welding seam and corrugations can be of the same or opposite hand.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel methods and combinations of elements and method steps as may be shown and described in connection with the device herein disclosed.

In the drawings:

FIG. 1 is a schematic top plan view of one form of apparatus for carrying out and embodying the invention;

FIG. 2 is a sectional view taken substantially along line 2—2 of FIG. 1;

FIG. 3 is a side elevation of a tube former and a corrugating head partly in section and with parts broken away;

FIG. 4 is an end view of the corrugating head shown in FIG. 3;

FIG. 4a is a fragmentary view of a portion of the corrugating head shown in FIG. 4;

FIG. 5 is a fragmentary side elevation of such corrugating head, partly in section and with parts broken away, illustrating certain other parts not shown in FIG. 3;

FIG. 6 is a plan view, partly in section and with parts broken away, of the tube alone as it is formed by the helical winding of the strip material by the tube forming device of FIG. 1;

FIG. 7 is a side elevation, partly in section and with parts broken away, of the tube shown in plan view in FIG. 6;

FIG. 8 is an end view, on the lefthand extremity thereof as viewed in FIG. 6, of the tube as it is being formed by the winding of the strip material;

FIG. 9 is an end view on the opposite end of the tube, that is, from the righthand extremity of FIG. 6;

FIG. 10 is a plan view on a somewhat enlarged scale with respect to FIG. 1, and showing the region of the tube former wherein the weld is made;

FIG. 11 is a perspective view of the portion of the apparatus shown in FIG. 10;

FIG. 12 is a sectional view taken substantially along line 12—12 of FIG. 11; and FIG. 13 is a sectional view taken substantially along line 13—13 of FIG. 11.

Referring to the drawings in greater detail, the novel apparatus embraces the following principal elements: a strip feeder 20 (FIG. 1) which moves the strip of sheet material, such as sheet metal for example, low carbon sheet steel, from a reel 21 and feeds same to a tube forming device shown generally at 22. Coacting with the tube forming device or tube former 22 are welding means 23 for continuously joining the leading edge of the oncoming strip with the trailing edge of the tube. Further, the apparatus includes a corrugating head 24 for continuously corrugating the tube formed by the tube former 22. The corrugating head 24 is schematically and briefly shown in FIG. 1, and certain principal elements thereof are well shown in FIG. 3, including a rotatively mounted inner sub-head 25 having inner corrugating rolls 26 and 27, and an outer corrugating sub-head 28, including outer corrugating rolls 29 and 30. The coaction of the corrugating rolls and the general operation of the corrugating head will be set forth in greater detail below.

There may be employed, in one form of the invention, suitable means for preventing injury to the tube as caused by the twisting thereof at a region intermediate tube former 22 and the corrugating head 24. The means for inhibiting or preventing the twisting of the tube in this region is referred to as a braking head and is designated generally at 31 and includes a plurality of frictionally retarded braking rolls 32 (FIG. 1) which are mounted upon an outer brake ring 33 in such a manner that the axes of rotation thereof are canted to be substantially perpendicular to the plane of the helix or a helical surface containing the helical line of welding. This is well shown in FIG. 1 wherein one of the rolls 32 is shown so disposed with its axis of rotation slightly canted with respect to the direction of advance of the corrugated tube 34. The plurality of rolls 32 mounted upon the ring 33, of course, are exterior to the tube and coact wtih a back-up roll 35 (FIG. 3) located within the tube 34 and mounted for rotation about the axis of the corrugating head. The rolls 32 are pressed in a direction radially inwardly of the tube and thus press the tube against the back-up roll 35. The brake ring 33 is rotated in a direction opposite to the direction of rotation of the corrugator 24. By virtue of a friction clutch associated with each brake roll 32, e.g., upon the shaft therefor, the braking action is obtained whereby the effect of the counter-moving braking rolls 32 (or wheels) is to overcome the effect of the twisting of the tube 34 in the aforementioned region intermediate to tube former 22 and the corrugating head 24. There is thus prevented a rupture or destruction of the tube in this region from such cause.

Alternative means can be employed for preventing injury to the tube as caused by twisting moments acting thereon at such region intermediate the tube former 22 and the corrugator 24, which alternative means are similar to the braking head above described except that the rolls 32 (FIG. 1) instead of being mounted with the axes of rotation thereof canted, as described above, are mounted with such axes parallel to a plane normal to the axis of the formed tube, it being understood, of course, that the periphery of each of the rolls 32 is in frictional engagement with the surface of the tube 34. Consequently each axis of each such roll 32 under these circumstances preferably is substantially perpendicular ot a radius of such tube passing through the point of tangency of the tube and roll.

Such twist-inhibitor in such alternative form thereof in effect comprises means which grips the tube firmly and rotates with it at the same speed but permits axial advance thereof. The friction clutch aforementioned in each wheel can be dispensed with in this alternative form. Thus such twist-inhibitor is referred to as gripper means and includes a gripper head which is identical to the braking head shown and described in FIG. 3 with the exception, as aforementioned, that the axes of rolls 32 are in the same attitude described in the preceding paragraph, and the gripper head 33 is rotated at the same angular speed as the tube 34 whereby such tube is firmly gripped between the rolls 32 and back-up roll 35 and is helped along in its rotation. Such alternative attitude of the rolls 32 permits the axial advance thereof without hindrance.

Thus such tube gripper means performs the added function of preventing the action of the corrugating head from interfering with the action of the tube former.

The tube 34 may be formed, as shown in FIG. 1, with the corrugated portions thereof separated by uncorrugated portions 36. Lengths of the tube may be cut as by saw or cuter means 37 which are movable, as shown, toward or away from the tube and/or lengthwise thereof.

Power means, such as a motor 38, actuates the metal strip feeder 20 as will appear more fully hereinafter.

A separate motor 39 provides power for rotating the inner corrugating sub-head 25, the outer corrugating sub-head 28, and the head 31.

The various elements of the apparatus will now be described in greater detail. Reverting to FIGS. 1 and 2, with particular reference to the strip feeder 20, the reel 21 of metal strip is mounted in a suitable way upon a spool 40 which rests rotatively upon a shaft 41 which in turn is mounted in a suitable cradle 41a.

The strip material from the reel 21 is indicated at 42 and is directed to a power driven feeder apparatus generally shown at 43 which includes a plurality of power driven feed rolls which, in the form shown, consists of a first pair of such rolls 44, 45 and a second pair 46, 47. The two rolls of each pair are rotatable upon horizontal axes and preferably are resiliently urged toward one another by adjustable means. All of the rolls 44–47 preferably are drivably connected to the motor 38. It is, of course, possible to separate the rolls 44 and 45 by suitable adjusting means of well known type. The strip 42 thus is pulled outwardly from the reel by the power driven rolls 44–47 and further is guided longitudinally by opposed guide rolls 48 and 49 (FIG. 1) which are mounted for rotation about substantially vertical axes.

If desired, a suitable straightening or flattening unit 50 may be employed with the tube feeder, which unit includes a pair of lower rolls 51 and 52 which are separated by selected distance and above which there is mounted a third roll 53, the strip passing above rolls 51, 52 but below roll 53. The latter may be adjusted up or down. Thus the roll 53 is staggered with respect to rolls 51 and 52 and assists in the feeding of the strip 42 in that it aids in flattening the latter.

We have found it desirable to provide an angularly shiftable frame 54 (FIG. 2) for supporting the several rolls 44–47 and 51–53 above described and also the spool shaft 41. The frame 54 is angularly shiftable about an axis 55 for the purpose of controlling the angle of feed of the strip 42 to the tube former 22. To this end, the frame 54 is pivotable upon a shaft 56, the axis of which is shown at 55 aforementioned, there being a suitable antifriction means, such as ball bearing 57, interposed between the frame 54 and a stationary bearing collar 58. The outer region or outer portion of the frame 54 removed from the pivot shaft 56 is movable upon an arcuate rail 59 with the aid of flanged rail engaging wheels 60 which, of course, support a portion of the weight of the frame 54, the wheels 60 being rotatably mounted upon the undersurface of the frame 54. The frame 54 by any suitable means (not shown) can be firmly clamped in a desired angular position about the pivot 55.

The tube former 22 aforementioned will now be described with particular reference to FIGS. 1, 2 and 3. The tube former 22, with particular reference to FIG. 3, consists of a tube forming mandrel 61 which in the form shown consists of two separate mandrel sections or rolls 62 and 63 which are coaxially mounted for rotation upon a rigid and fixed main support post or sleeve 64. The latter sleeve is fixedly secured and hence not subject to rotation and provides a strong and rigid mounting for the aforementioned mandrel sections 62 and 63. The means for mounting the main support sleeve 64, in the form shown, comprises a frame 65 to which it may be fixedly secured. Or, if desired, suitable means may be provided which permits such main support sleeve 64 to be raised or lowered, for example, by manual adjustment of the handwheel 66. It is, of course, understood that suitable bearing means are interposed between the sleeve-like mandrel sections 62 and 63 and the main support sleeve 64, such bearing means, for example, being shown at 67. The mandrel sections 62 and 63 are separately rotatable although it is within the purview of the invention for them to rotate together if desired.

The outer diameter of the mandrel 61 is substantially less than the inner diameter of the tube 34 whereby the helically wound strip material 42 which forms the tube 34 rests upon the upper surfaces of such mandrel, as is well shown in FIG. 3.

Also well shown in FIG. 3 is the location of a peripheral band 62a comprising a portion of the sleeve-like mandrel section 62. Such band 62a is positioned whereby its outer surface is flush with the outer surface of the section 62 and provides an annular surface against which is effected the joining of the edges of the strip material in helical configuration to form the tube. The band 62a can be of hard copper alloy which assists in dissipation of the heat of welding. Further, in order to aid in the carrying away of the heat incidental to the welding, the mandrel may be water-cooled, for example, the main supporting sleeve 64 can be water-cooled in any suitable manner, as by drilling or forming suitable water passages therein.

The strip of sheet material 42 (FIG. 2) is guided toward the tube former 22 not only by the above-described rolls, the guide wheels described in connection with the feeder 20, but also an additional pair of guide wheels 67 and 68 (FIG. 1) and a guide roll 69. The rolls 67–69, inclusive, more properly comprise a portion of the guide roll means of the tube former rather than the strip feeder 20.

By virtue of the disposition of the strip feeder 20, the strip being fed angularly offset with respect to a line perpendicular to the longitudinal axis of the tube former, the strip material 42 is directed thereto in such a way that it can be helically wound into a tube with the aid of guide roll means (FIG. 2), including guide rolls 70, 72, 73, 74, 75 and 76. Guide roll 70 is mounted for rotation about a substantially horizontal axis whereby the line of tangency thereof with the oncoming strip 42 is perpendicular to the longitudinal axis of such strip. The strip 42 will not undergo sideslip relative to the roll 70. Roll 70 is constructed and arranged for urging the strip downwardly in contact with the upper surface of the mandrel 61 and in particular upon the upper surface of the mandrel section 62. In one form of the invention the edges or marginal regions of the strip material are caused slightly to overlap (FIG. 3) at the point where the tube is formed and a mash weld is performed continuously thereby pressing the overlapping edges into a flattened condition with the aid of pressure of the aforementioned guide roll 70 against the mandrel 61. A portion of such guide roll 70 and the mash welding operation is shown in FIG. 11 and is accomplished by the application of electrical energy of radio frequency in a known manner.

Referring further to FIGS. 2 and 11, it will be seen that the guide roll 70 also urges a portion of tube 34 radially inwardly toward the axis of the inner mandrel 61 and effects a radial inward force causing contact of the upper inner surface of such tube portion with the outer surface of the mandrel at region 71. It is at such region that the weld can occur.

Whereas roll 70 is canted with respect to the tube 34, the rolls 72 to 76 are not so canted, and the axes of such latter rolls are parallel to the axis of such tube. However, if desired, the axes of any of such rolls can be so canted to a selected degree of adjustment means shown in FIG. 2 and described below, such canting being for the purpose of adjusting the effective working angle of the roll or rolls with respect to the formed tube.

Although the roll 70 is shown in the drawings as being of substantial width, it is not necessary for it to be so wide, in fact, it need not be any wider than is necessary to press satisfactorily against the relatively narrow mash weld region. However, roll 70, when of such relatively large size, facilitates the dissipation of the heat of the weld.

Three additional tube-advancing rollers 70a, 70b and 70c (FIGS. 1 and 2) preferably are employed in the tube former 22 for the purpose of insuring the longitudinal advance of the tube by virtue of the contact of the lefthand edge (FIG. 1) of the strip material 42 therewith. Such rolls 70a, 70b and 70c are mounted for rotation upon substantially radially extending axes and are positioned whereby their respective peripheries engage the left-hand edge of such strip material and thus by virtue of the forceful strip feed such rolls urge the formed tube longitudinally. This, of course, is facilitated by means of the weld which is formed between the edges of the strip and the tube. Such weld communicates to the tube the axially directed force which causes the advance in the formed tube. Thus when the corrugating sub-heads are disengaged in order to produce the uncorrugated section, such as 36 (FIG. 1), the tube will still advance under the action of the rolls 70a, 70b and 70c.

Each of such guide rolls (70, 72–76) are mounted upon suitable means whereby they may be adjusted in position toward or away from the axis of the tube 34. The mounting of the guide roll 73 is typical and comprises (FIG. 2) a guide roll supporting bracket 77 having a pair of parallel arms, one of which is shown at 78, for supporting the opposite ends of a guide roll shaft 79. The supporting bracket 77 is in turn movably secured to a stationary frame member 80 by means of a divided sleeve 81 which is axially shiftable upon and embraces a supporting post 82, the latter being fixedly secured to the frame 80. The main bracket 77 hence is axially shiftable with respect to the axis of the post 82, for example, by means of a handwheel 83 having a threaded shaft 84 which is restrained from axial movement and which engages a bushed sleeve 85, the latter being rigidly secured to the bracket 77. The angular position of any of the rolls 72 to 76 can be adjusted about the axis of such post 82 by: loosening clamping screws 81a, 81b of the divided sleeve 81, making such angular adjustment, and tightening the screws. Such clamping screws, of course, should be loosened prior to moving handwheel 83. Thus the same set of rolls can be adjusted for different tube diameters.

Consequently, by virtue of the above adjustable mounting, the guide roll 73 can be adjusted radially and angularly of the selected axis of the tube 34 in a desired manner. Analogous mountings for all of the other guide rolls 70, 72, 74, 75 and 76 are provided.

Reverting now to the welding means 23 and in particular to the welding device shown in FIGS. 1, 10 and 11, such means includes a pair of electrodes 86, 87 which at their lower extremities, as viewed in FIG. 11, are in contact respectively with the oncoming strip material 42 and the tube 34 and on opposite sides of the juncture line therebetween. The electrodes may be connected to a source of electrical energy, for example, of radio frequency, which effects a weld in the region 88 between the aforementioned strip 42 and the tube 34 in a known manner. It is considered that the strip 42, which is fed to the tube former 22, becomes a portion of the tube 34 at the time the weld is formed by the welding means 23. The guide roll 70 of FIG. 11 serves the dual purpose of not only guiding the strip and urging same downwardly upon the tube forming mandrel 61, but also serves to mash the slightly overlapping marginal regions of the strip 42 and the adjacent portions of the tube 34 with the aid of the current fed by the electrodes 86 and 87 thereby effecting such mash weld. Although one form of the invention includes the steps of forming a tube by helically winding metal strip about a selected axis with the edges of the strip overlapping and in helical conformation while applying pressure and electrical energy of radio frequency to such overlapping edges at a welding zone past which such overlapping edges are moved while rotating the tube about such axis thereby to effect a mash weld, and while applying corrugating pressures to such welded tube so formed, the invention, in other forms, is not limited to any particular form of welding, it being possible to employ other weld techniques, for example, welds of the so-called lap variety or butt variety. In the mash weld here proposed there is a relatively small overlap of the edges and there is no metal added to form the weld nor is any flux employed.

Referring to FIGS. 12 and 13, the mash weld operation is illustrated before and after the application of the mashing pressure which presses the edges together with the accompaniment of the heat produced by the electrical energy aforementioned. In FIG. 12, it will be seen that the marginal region 42a of the surface strip 42 is slightly in overlapping relation with a marginal region 34a of the tube 34 and that this relatively slight overlap is mashed downwardly into a flat configuration with respect to the balance of the tube as shown in FIG. 13. The mash weld region may be flush with the remainder of the tube or may be slightly elevated, depending upon the degree of pressure applied.

The corrugating head 24 will now be described with particular reference to FIGS. 1 and 3. In order to be able to produce a tube continuously, it is mandatory that the supporting means for the tubing device in turn be supported from the tube forming extremity thereof which requires htat the mandrel 61 be supported only at the lefthand extremity, as viewed in FIG. 3, by means of the frame 65. It, of course, is true that the mandrel 61 per se is supported at both its right and lefthand extremities and also at intermediate points, but the principal support therefor is obtained by means of the frame 65 and the main support sleeve or post 64 which protrudes into the tube from its lefthand extremity, as viewed in FIG. 3, and, of course, has no support protruding into such tube of the righthand extremity.

Consequently, the corrugating head 24, as aforementioned, is provided with the inner rotatably mounted sub-head 25 which must be supported from its lefthand extremity thereof (FIG. 3) by means of a supporting shaft 89 which passes through passage 64a formed longitudinally of the main supporting sleeve 64. Such passage 64a is formed eccentrically within sleeve 64 by virtue of the fact that the outer diameter of the tube forming mandrel 61 is substantially less than the inner diameter of the tube 34. The aforementioned shaft 89 is mounted in suitable bearings preferably located at the inner opposite extremities of the main support sleeve 64, such main bearings being designated at 90 and 91 respectively. Further, suitable means are provided for preventing axial motion of the shaft 89 and thereby restraining the inner corrugating sub-head 25 from axial motion for a purpose to appear more fully hereafter.

While certain of the rolls such as 70a, 70b and 70c (FIG. 1) cause axial advance of the tube due to the forceful thrust of the strip 42 into the tubing machine, such tube also receives an axial thrust due to the action of the rotating corrugating head 24 having the canted corrugating rolls such as 26, 27 and 29, 30. In order for this longitudinal advance of the tube to occur under the action of head 24, it is necessary to restrain the aforementioned corrugating sub-heads 25 and 28 from axial movement. The corrugating sub-head 25 is rigidly secured to the shaft 89. As is well shown in FIG. 3, there is mounted upon the shaft 89 and adjacent to sub-head 25, the back-up roll means 35 of the twist-inhibiting means 31 aforementioned.

The sub-head 25 is driven by means of the main driving motor 39 (FIG. 3) which may be operatively connected thereto, for example, by means of the gears 92 and 93, it being understood, of course, that any suitable operative interconnection therebetween may be employed.

As is well shown in FIG. 3, the principal supporting member for the outer corrugating rolls comprises a ring 94 having a central aperture therein through which passes the tube 34. The support ring 94 is peripherally supported by a plurality of guide wheels 95, the disposition of which is well shown in FIG. 4, there being in the form shown eight of such guide wheels. The latter are suitably flanged at 95a and 95b for the purpose of preventing axial movement of the support ring 94, it being understood that the periphery 95c of the guide wheels 95 bears the load of the ring 94.

In the form shown, there are two outer corrugating rolls 29 and 30, as shown in FIG. 3, and as aforementioned such outer corrugating rolls are mounted in such a way that they can be disengaged from the tube and thus withdrawn to an inoperative position with respect to the inner corrugating rolls 26 and 27.

The mounting for the corrugating roll 29 will now be described with respect to the main support ring 94, it being understood that the mounting for the corrugating roll 30 is analogous thereto. The mounting for the corrugating roll 29, as is well shown in FIGS. 4 and 4a, comprises a bifurcated lever 96 having two parallel arms 97 and 98 (FIG. 3) which are rigidly secured together by means of an interconnection 99, and which bifurcated lever is pivotally mounted upon the support ring 94 by means of a pivot shaft 100 rigidly secured to such ring 94. The pivot 100 is at one extremity of the lever 96. The opposite extremity of such lever is movable for the purpose of engaging or disengaging the outer corrugating roll 29 from the tube 34. The corrugating roll 29 is mounted for rotation between the two rigidly secured parallel arms 97 and 98 by means of a shaft 29a.

The corrugating roll 30 in turn is analogously mounted as aforementioned upon a bifurcated lever 101 which is pivoted at 102 to the support ring 94 at one extremity thereof, the opposite extremity being movable. In the form shown, power means are operatively connected to the movable extremities 96a and 101a of the levers 96 and 101 whereby they may be moved toward or away from one another under the influence, for example, of an electric motor 102 which is rigidly secured at 103 to the main support ring 94 aforementioned. Protruding coaxially from opposite extremities of the motor 102 are two oppositely threaded shafts 104 and 105 which respectively threadedly engage internally threaded sleeves 106 and 107 pivotally secured to the extremities 96a and 101a of the levers 96 and 101 respectively. The helical threads upon the threaded shafts 104 and 105 are so disposed that actuation of the motor 102 in one direction will urge the corrugating rolls 29 and 30 away from one another and to an inoperative position, and rotation in a reverse direction will bring them to the opposite position shown in FIG. 3.

The inner and outer limits of the angular motion of the bifurcated levers 96 and 101 are determined respectively by adjustable limit-stop elements 108 and 109 respectively which are secured to the main supporting ring 94. For example, for the limit stop 108 an adjustment screw 110 is provided in the lower extremity, as viewed in FIG. 4, for governing the innermost limit of angular motion of the lever 96. Thus the degree of penetration of the corrugating rolls can be controlled by the adjustment of a limit-stop, such as 110.

It should be noted here that the outer diameter or the maximum diameter of the diametrically opposed corrugating rolls 26 and 27 is substantially equal to the inner diameter of the tube 34.

The corrugating rolls 26 and 27 are preferably disposed diametrically opposed to one another although the invention is not limited thereto. Hence the corrugating rolls 29 and 30 are similarly disposed but on the outside of the tube.

Electrical energy is communicated to the motor 102 by any suitable means, for example, by means of a slip ring 111 (FIG. 5) which is secured to the main support ring 94 and suitably insulated therefrom in a well known manner, the motor 102 being connected thereto by suitable electrical conductors 112 (FIG. 5). Brush holders 113 (FIG. 3) are rigidly secured at 114 to a stationary frame 115 for the purpose of holding brushes in contact with the slip ring 111.

Rotation of the outer corrugating sub-head 28 is accomplished with the aid of a gear 116 (FIG. 3) having a toothed periphery and a suitable central passage through which can pass the tube 34, the gear 116 being secured by any suitable means as at 117 to the main support ring 94. As shown in FIG. 1, an operative interconnection between the main drive motor 39 and the gear 116 is accomplished by the suitable gearing shown whereby the corrugating sub-head 28 is shifted or rotated at an angular speed equal to and in the same direction as that of the corrugating sub-head 25.

The tube twist inhibitor means 31 (FIG. 1) will now be described in further detail with particular reference to FIG. 3 wherein it will be seen that the rolls 32 are mounted in the ring 33 in such a way that they are urged resiliently radially inwardly toward the tube 34, for example, by means of springs, one of which is shown at 118 in connection with the uppermost roll 32 of FIG. 3. The spring 118 is interposed between a portion of the ring 33 and a yoke 119 which mounts the shaft of the roll 32.

The ring 33 is mounted in a manner somewhat analogous to that of the main support ring 94 for the corrugating sub-head 28 in that a plurality of flanged support wheels 120 are employed for peripherally supporting the ring 33. The periphery of the ring 33 is provided with teeth which protrude into the aperture between the flanges of the wheels 120. Such wheels are suitably mounted in a stationary annular frame member 121 for this purpose and are restrained from axial movement. The flanged guide wheels 95 are similarly mounted in the annular stationary frame element 121.

The yoke aforementioned 119 (FIG. 3) is axially shiftable in a suitable recess which prevents any angular movement of the yoke but permits same to shift radially and axially as can be well understood from the showing of FIG. 3. Roll 32 can be either in the attitude shown in FIG. 1 wherein its axis of rotation is slightly angularly offset with respect to the direction of advance of the tube as aforementioned or alternatively such axis can be parallel to a plane normal to the longitudinal axis of the tube for purposes described above.

The ring 33, with the aid of its toothed periphery, is operatively connected to the main drive motor 39 by means of a gear train interconnection. Motor 39 drives same in a direction opposite to the direction of rotation of the corrugator when the rolls 32 are so canted or alternatively such ring 33 is driven in the same direction and the same angular velocity as the tube 34, for example, when the axis of rolls 32 are parallel to a plane normal to the longitudinal axis of the tube.

There is a well defined speed ratio between: (a) the speed of operation of the tube former 22 and (b) the speed of operation of the corrugating device or means 24. For every linear foot of tube that is produced by the tube former 22, the corrugating head 24 must operate at least at an angular speed relative to the tube which is adequate to accommodate such tube production. Thus for every foot of tube produced by the tube former, the corrugating head must receive it, corrugate it and discharge it. If we assume that the lead of the corrugations produced by the corrugating head 24 is, for example, two inches, that is, if we assume that the distance a corrugation advances axially in one turn is two inches, then it is clear that a relative movement between the tube 34 and the corrugating head of 360° will advance the tube two inches. Consequently, for the corrugating head to advance the tube one foot, it would require six full turns of such head relative to the tube. Hence, for every linear foot of tube produced by the tube former 22 under this set of circumstances, the corrugating head must turn six times relative to the tube in order to accommodate the output of such tube former.

Thus the strip-feeder means must be operated at a definite speed relationship with the tube former and with the corrugating means and must feed the strip 42 at a linear speed which is a function of the speed of rotation and lead of the corrugating head 24.

Thus the corrugating head is able to form corrugated tube at a selected and adjustable rate in feet per minute. The speed of strip feed must be controlled to form the tube in the tube former at a linear rate which is thus correlated with the speed of rotation and lead of the corrugating head. In the form of the invention shown, the tube 34 rotates in the same direction as the corrugating head 24 although this is not mandatory, it being possible for the corrugating head to rotate in an opposite direction. It is the relative rotation of the tube and the corrugating head which determines the linear output of corrugated tube from the corrugating head. Thus reverting to the prior set of circumstances set forth above, if the lead of the corrugations produced by the corrugating head is two inches, it will require six turns of the corrugating head relative to the tube in order to produce one foot of corrugated tubing. Thus, for example, if the tube is turning at the rate of two revolutions per minute in a counterclockwise direction and a relative rotation between the tube and the corrugating head of six revolutions per minute is required, then the corrugating head need turn only four revolutions in one minute in an opposite direction in order to achieve the proper relative movement between the two.

In the form of the invention shown, with particular reference to FIG. 4, the tube and corrugating head both turn in a counterclockwise direction and hence it will be necessary for the corrugating head to speed up in rotation at least by an amount equal to the speed of rotation of the tube itself in order to accomplish the desired relative movement therebetween. For example, if the tube is turning counterclockwise at 2 r.p.m. and a six revolution relative movement is required between the tube and the head, it will be necessary for the corrugating head to turn eight revolutions per minute.

In operation, the strip feeder motor 38 is operated at a speed to feed the strip material 42 to the tube former 22 at a selected linear rate ($x$) which is preselected to form tube from the helically wound strip at still another and selected linear rate ($y$), the tube formed at the latter rate being accommodated by the rotating corrugating head. In the form shown, the tube 34 and corrugating head rotate in the same direction but with different angular velocities, but nevertheless, the speed of rotation of the corrugating head is closely correlated to the speed of the feed of the strip material 42 whereby the corrugating head accommodates at the proper rate the tube which is formed, in that it corrugates it and discharges it at a selected rate. The twist-inhibiting means 31 is rotated as aforementioned. The inner and outer corrugating subheads are rotated together at a common angular velocity as aforementioned and by the same power source, preferably, which rotates the head 31.

The present invention also embraces a novel method for the continuous formation of corrugated tubing, which method includes the following steps:

(1) Continuously feeding a strip or ribbon of sheet material, such as metal, preferably of constant width, to a tube forming region, such strip feed being at a selected speed and occurring lengthwise thereof, that is, in a direction longitudinally of the strip, the strip being directed to the tube forming region in a direction which is generally across the axis of the tube to be formed.

(2) Guiding the oncoming continuously fed strip into a helical path in said tube forming region with the edges or margnial regions thereof in engagement thereby forming a helical engagement region and thus a cylindrical tube about a selected axis. The strip, by virtue of its being directed to the tube forming region in a direction angularly offset from a line perpendicular to the direction of tube advance, facilitates the directing of the strip into a cylinder or tube, the marginal regions of the strip being in helical configuration and hence the centerline of the strip also being in the shape of a helix, said cylindrical tube so formed thus rotating about its axis at an angular speed which is a direct function of the speed of strip feed, and the linear speed of a point on the periphery of said tube being the same as the speed of advance of said strip.

(3) While so guiding and feeding the strip, continuously joining the leading longitudinal side edge thereof to the rear edge of the tube so formed, such joining being assisted by the application of heat, and in one form of the invention by the overlapping of such strip and tube edges and the pressing of such overlapping edges into substantially flat condition while heating same as by the application of electrical energy of radio frequency.

(4) While continuously so forming the tube, simultaneously helically corrugating the same by the application of corrugating pressure progressively about the tube in a rotational movement and in an axially fixed corrugating zone, such corrugating pressure being applied by corrugating rolls which are positioned both within and without the tube and which rotate upon their respective axes and which also move planetarily about the axis of the tube. The angular speed at which said corrugating pressure is applied has a preselected ratio to the rate at which tube is formed in the tube forming region and hence is a function of the speed of strip feed thereto.

Reverting to the aforedescribed speed ratio between the speed of operation of the tube former 22 and the speed of operation of the corrugating device 24, in the preferred embodiment of the present invention, it is desired for such speed ratio to be maintained which will produce a continuously corrugated tube (with the exception of such uncorrugated portions 36). That is, such speed ratio should be selected whereby consecutive 360° turns of the corrugations are adjacent one another with no uncorrugated surfaces therebetween. However, in a further form of the invention it is possible to urge the tube through the corrugating head at such a longitudinal speed of advance that such consecutive turns of the corrugations are no longer adjacent one another but are separated by uncorrugated surfaces (again excepting portions 36), this being referred to as a discontinuous corrugation. Preferably, the angle of cant of the corrugating rolls should be adjusted to correspond to a newly selected lead of such discontinuous corrugations. Thus in the operation of the device it is possible to urge the tube through the corrugating head sufficiently fast that the latter cannot form a continuously corrugated tube.

For the formation of such a continuously corrugated tube, as shown in FIG. 1 (excluding uncorrugated portions, such as 36), it is desirable operatively to interconnect the strip feeder motor 38 and the main drive motor 39 by any suitable means, such as those shown schematically at 39a, to insure the desired speed ratio between these motors. Such operative interconnection 39a may include suitable speed adjustment means for changing such speed ratio whereby the tube is formed at a speed greater than that demanded by the corrugating head 24 which will result in the forming of a tube having such discontinuous corrugations.

Also it is possible to employ a single drive means (not shown) in lieu of the two motors 38 and 39. That is, a common motor can drive both the strip feeder 20 and the remainder of the apparatus, there being also provided suitable means for controlling the speed of the strip feed with respect to the angular speed of the corrugating head for the purpose of forming either of the above two types of tube corrugations, namely, continuous or discontinuous.

It is also possible to form either "single thread" or "multiple thread" corrugations, those shown in the drawings being of the "double thread" type as aforementioned.

Although a novel apparatus has been herein shown and described for winding a strip of sheet material across a selected axis and into a helical tube, it is to be understood that as to the tube former aspect of the novel combination, other suitable tube formers can be employed which are capable of continuously winding a strip of sheet material helically about a selected axis and into a cylinder whereby the margins of the wound strip, that is, the helical edges thereof are adjacent one another or, more specifically, overlap one another.

It is understood that the invention comprising the novel apparatus is not necessarily limited to the use of rolls, it being possible to substitute, for example, equivalent devices, such as balls.

In lieu of the copper band 62a beneath the mash weld region, as is shown in FIG. 3, it is possible to employ a suitable inner canted roll (not shown) for backing-up roll 70 and which, if desired, can be of substantially smaller diameter than the mandrel sections 62, and which can be suitably mounted, as upon the main support sleeve 64. Such roll can be so disposed that its periphery will roll upon the inner surface of the tube without the tube having to slip thereover. The axis of rotation of such inner roll thus can be substantially perpendicular to the plane of the helical seam so that there will be no side slip of the oncoming strip or of the formed tube thereover.

There is thus provided a novel method and apparatus for continuously forming corrugated metal tubing of high strength and at heretofore unattained low cost, the method and apparatus being operable continuously as opposed to a batch operation. Such invention produces a corrugated tubing, the lead of the corrugations thereof being selectable without regard to the lead of the weld seam. The corrugations may be disposed at a substantial angle to the weld seam whereby they cross same without running therealong over any substantial distance. However, it is possible for the corrugations to move generally along the helical weld seam, if desired. The weld seam may produce a lefthand helix and the corrugations may be a righthand helix. That is, the hand (direction of turn) of the weld seam and of the corrugations may be the same or opposite as desired. Further, because of the ease of the selection of the pitch and/or lead of the corrugations of the cylindrical tube and because of the ease of the adjustment of the apparatus to produce tubes of differing diameters, it is possible to make sections of corrugated tubes with great ease and at low cost which can be threadedly interconnected, if desired. The leading longitudinal side edge of the oncoming strip is continuously welded to the rear edge of the tube or cylinder so formed and the cylinder is corrugated, the welding and corrugating being simultaneous and continuous. However, if desired, the corrugating means can be rendered inoperative as desired for the forming of uncorrugated sections of the tube for the purpose above mentioned. The cylindrical tube and not the strip is thus corrugated making the lead and/or pitch of the corrugations independent of the lead of the helical strip winding which comprises the cylindrical tube and thus independent of the lead of the helical seam of the cylindrical tube.

What is claimed is:

1. In apparatus for continuously forming a tube about a selected axis by helically winding thereabout a strip of sheet metal and corrugating such tube, including in combination: a strip feeder having opposed feed roll means between which such strip is directed, said feed rolls being power driven thereby forcefully feeding same; a tube former for receiving the strip from said strip feeder, including guide means for guiding such strip in a helical path about such axis into a tubular configuration having the edges of the strip positioned adjacent one another, said tube former also including a welding means for continuously joining the edges of the oncoming strip with those of the tube, the tube so formed thus being caused to rotate about such axis at a rate proportional to the speed of such strip feed, said tube former including a rotatable central roll, the axis of rotation of which extends in the same direction as the longitudinal axis of said tube and upon the upper surfaces of which the tube rests as the strip is formed into such tube as aforementioned; a corrugating head positioned for corrugating the tube so formed by the tube former, said corrugating head including an inner corrugating sub-head mounted for rotation within such tube, an outer rotatably mounted corrugating sub-head constructed and arranged for cooperating with said inner sub-head for corrugating such tube, means for rotating said sub-heads in a common angular direction at a common angular speed whereby they cooperate to corrugate such tube, said corrugating sub-heads being mounted for rotation about such longitudinal axis of the tube; said strip feeder including means for feeding said strip to said tube former at a selected speed having a predetermined ratio with respect to the speed of rotation of said corrugating head, said ratio being a function of the lead of the corrugation of the tube as compared to the rate of formation of such tube, tube braking head means situated intermediate the aforementioned corrugating head and tube former and including inner back-up roll means situated within the tube and engaging the inner surface thereof, said back-up roll means being mounted coaxially with the corrugating head for rotation about such axis, said braking head means also including an outer gripper roll ring mounting a plurality of outer gripper rolls for engaging the outer surface of the tube which is exterior to and supported interiorly by said back-up roll means, said gripper roll ring being situated exterior to such tube and mounted for angular movement about such axis, and means for rotating said gripper roll ring whereby to prevent injury to the tube through twisting in the region intermediate said tube former and said corrugating head.

2. The process of forming metal tubular sheathing from a metal strip, comprising continuously forming said strip into tubular form, feeding the tubing to a welding station for forming a continuous, butt joint between the opposed strip edges, feeding the welded tubing to a corrugating station for transversely corrugating said tubing, and gripping said welded tubing during the movement thereof between said welding and corrugating stations to prevent the transmission of stresses originating at said corrugating station, to said welding station through said tubing.

3. The process of forming metal tubular sheathing from a metal strip, comprising continuously forming said strip into tubular form, feeding the tubing to a welding station for forming a continuous joint between opposed strip edges, feeding the welded tubing to a corrugating station for transversely corrugating said tubing, and gripping said welded tubing during the movement thereof between said welding and corrugating stations to prevent the transmission of stresses originating at said corrugating station, to said welding station through said tubing.

References Cited by the Examiner

UNITED STATES PATENTS

| | | | |
|---|---|---|---|
| 76,220 | 3/1868 | Mason | 153—72 |
| 270,314 | 1/1883 | Hope | 153—72 |
| 947,229 | 1/1910 | Fulton | 153—73 |
| 1,407,001 | 2/1922 | Schroder | 153—69 |
| 1,774,000 | 8/1930 | Hand | 78—86 |
| 1,788,220 | 1/1931 | Williams | 113—35 X |
| 2,506,657 | 5/1950 | Webster | 153—73 |
| 2,525,300 | 10/1950 | Jones | 113—35 |
| 2,663,784 | 12/1953 | Iversen | 219—83 |
| 2,734,472 | 2/1956 | Bornand | 113—35 |
| 2,774,857 | 12/1956 | Rudd | 219—67 |
| 2,800,561 | 7/1957 | Shenk | 219—8.5 |
| 2,873,353 | 2/1959 | Rudd | 219—62 |
| 3,023,300 | 2/1962 | Lehnert | 219—60 |

FOREIGN PATENTS 477,526   12/1937   Great Britain.

RICHARD M. WOOD, *Primary Examiner*.

JOSEPH C. MANIAN, W. A. WILTZ, *Examiners*.

N. BERGER, W. ROTERT, A. ZOBAL,
*Assistant Examiners*.